(12) United States Patent
Abramson et al.

(10) Patent No.: US 8,903,904 B2
(45) Date of Patent: Dec. 2, 2014

(54) PUSHING IDENTITY INFORMATION

(75) Inventors: Sandra Abramson, Freehold, NJ (US);
Anthony Frissora, Fair Haven, NJ (US);
Raj Sinha, West Orange, NJ (US)

(73) Assignee: Avaya Inc., Basking Ridge, NJ (US)

( * ) Notice: Subject to any disclaimer, the term of this patent is extended or adjusted under 35 U.S.C. 154(b) by 170 days.

(21) Appl. No.: 12/838,225

(22) Filed: Jul. 16, 2010

(65) Prior Publication Data
US 2011/0047245 A1 Feb. 24, 2011

Related U.S. Application Data

(60) Provisional application No. 61/235,838, filed on Aug. 21, 2009.

(51) Int. Cl.
*G06F 15/16* (2006.01)
*H04M 1/253* (2006.01)
*H04M 1/57* (2006.01)

(52) U.S. Cl.
CPC ............ *H04M 1/2535* (2013.01); *H04M 1/576* (2013.01)
USPC ........................................................ 709/204

(58) Field of Classification Search
USPC ................................................. 709/204, 217
See application file for complete search history.

(56) References Cited

U.S. PATENT DOCUMENTS

| | | | |
|---|---|---|---|
| 7,181,472 B2 | 2/2007 | Cameron et al. | |
| 7,478,129 B1 | 1/2009 | Chemtob | |
| 2002/0090069 A1 | 7/2002 | Yaker | |
| 2003/0050977 A1* | 3/2003 | Puthenkulam et al. | 709/204 |
| 2004/0194116 A1 | 9/2004 | McKee et al. | |
| 2005/0216300 A1* | 9/2005 | Appelman et al. | 705/1 |
| 2005/0246420 A1* | 11/2005 | Little, II | 709/204 |
| 2008/0102856 A1* | 5/2008 | Fortescue et al. | 455/456.1 |
| 2008/0104495 A1 | 5/2008 | Craig | |
| 2008/0263158 A1 | 10/2008 | Del Cacho et al. | |
| 2009/0125521 A1* | 5/2009 | Petty | 707/9 |
| 2009/0204598 A1* | 8/2009 | Crane et al. | 707/5 |
| 2009/0249451 A1* | 10/2009 | Su et al. | 726/5 |

(Continued)

FOREIGN PATENT DOCUMENTS

| | | |
|---|---|---|
| EP | 1924066 | 5/2008 |
| JP | 2009146315 | 7/2009 |
| KR | 906912 | 7/2009 |

OTHER PUBLICATIONS

Extended Search Report for European Patent Application No. 10172583.6, dated Mar. 1, 2012 10 pages.

(Continued)

*Primary Examiner* — Jason Recek
(74) *Attorney, Agent, or Firm* — Sheridan Ross P.C.

(57) ABSTRACT

A system allows a user to send alias information or receive alias information during a communication between two communication devices. Alias information is identity information for a user that identifies the user on a social media site or network (e.g., Facebook, Twitter, LinkedIn, etc.). The alias information can be stored in a contacts program or other data store. During a web-based telephone call between two IP-enabled phones, the alias information may be retrieved. The alias information can then be sent to the other IP-enabled phone or to another device associated with the calling party. In response to receiving the alias information, the calling party can automatically retrieve information associated with the called party and the alias from one or more social media sites.

20 Claims, 7 Drawing Sheets

(56) References Cited

U.S. PATENT DOCUMENTS

| | | | |
|---|---|---|---|
| 2009/0328177 A1* | 12/2009 | Frey et al. | 726/9 |
| 2010/0144318 A1* | 6/2010 | Cable | 455/412.1 |
| 2010/0250676 A1* | 9/2010 | Ufford et al. | 709/204 |
| 2010/0287256 A1* | 11/2010 | Neilio | 709/217 |
| 2010/0318925 A1* | 12/2010 | Sethi et al. | 715/760 |
| 2010/0322402 A1* | 12/2010 | Ramanathan et al. | 379/211.01 |
| 2011/0023129 A1* | 1/2011 | Vernal et al. | 726/28 |
| 2011/0302019 A1* | 12/2011 | Proctor et al. | 705/14.27 |

OTHER PUBLICATIONS

Official Action with English Translation for Korea Patent Application No. 2010-0081649, dated Sep. 27, 2013 6 pages.

Official Action with English Translation for Korea Patent Application No. 2010-0081649, dated Mar. 26, 2014 3 pages.

* cited by examiner

PUSHING IDENTITY INFORMATION

CROSS REFERENCE TO RELATED APPLICATIONS

This application claims the benefit of and priority under 35 U.S.C. §119(e) to U.S. Patent Application No. 61/235,838, filed Aug. 21, 2009, entitled "MOJO," which is incorporated herein by reference in its entirety.

BACKGROUND

Many people get information from or provide information to social media. Social medial include an ever increasing collection of blogs, micro blogs (e.g., Twitter), social media sites (e.g., Facebook or MySpace), video blogs, or other social media networks and/or sites. A user may be identified in each social media network or site by a different "handle" or alias. It is often not possible to gather information about a person from the various social media networks or sites because the alias for the social network or site is not known. Thus, creating a profile for a user from information on the social networks or sites is not possible.

SUMMARY

The embodiments presented herein allow a user to send alias information or receive alias information during a communication. For example, alias information can be stored in a contacts program or other data store. During a web-based telephone call, the alias information may be retrieved. The alias information can then be sent to the other communication device or to another device associated with the calling party. In response to receiving the alias information, the calling party can automatically retrieve information from one or more sources, for example, social media sites, local or distant storage, a local email system, etc.

In embodiments, the system conducts a communication between at least two parties or users. During or before the communication, a first user may push alias information to a second user. In other embodiments, the alias information is pulled or requested and received. The alias information includes the identity information for the first user associated with one or more social network sites. For example, if the first user uses the alias "BigPapi" on Twitter, the "BigPapi" alias is pushed to the second user.

With the alias information, the second user or a system or application associated with the second user can interact with the one or more social network sites to extract information from those social network sites. For example, the number of postings, the content of postings, biographical information, etc. may be gleaned from the social network sites.

In further embodiments, the first user may be able to select how alias information is passed to another user. For example, the first user may be able to set preferences for how alias information is shared. One group or individual may receive a predetermined set of alias information, while a second group or individual may receive a different predetermined set of alias information. The preferences can delineate between business and personal aliases, internal company and external company alias information, etc.

What alias information is passed or what information is taken from the social network site may also be determined by the activity or content. For example, if a post on a social media site relates to a skiing vacation, the content of that post may not be sent to or retrieved by a business user. As such, information about a person can be gathered and used to facilitate more directed communications.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "in communication with" as used herein refers to any coupling, connection, or interaction using electrical signals to exchange information or data, using any system, hardware, software, protocol, or format.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the embodiments are considered to include a tangible storage medium and prior art-recognized equivalents and successor media, in which the software implementations are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the embodiments is described in terms of examples, it should be appreciated that individual aspects of the embodiments can be separately claimed.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
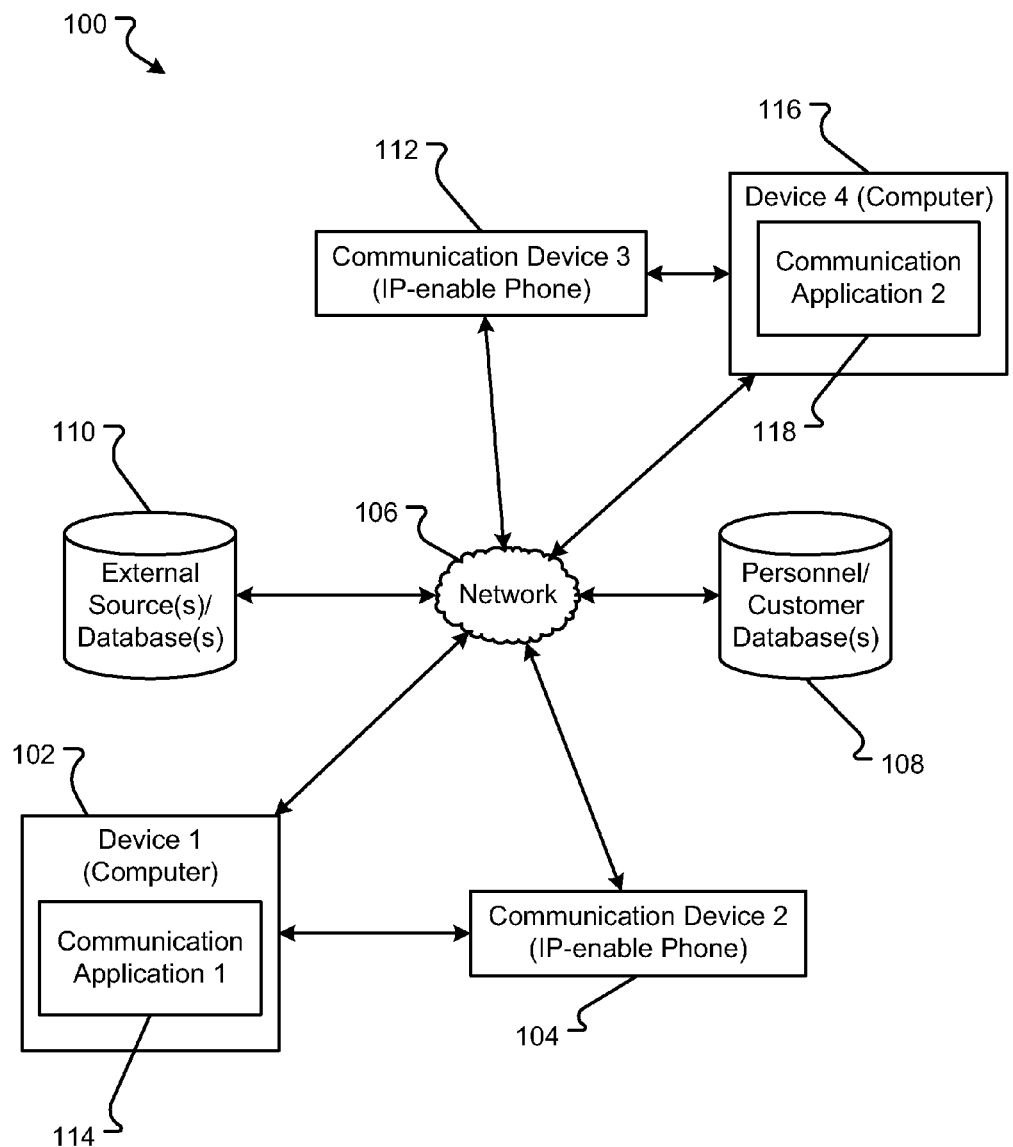
FIG. 1 is a block diagram of an embodiment of a system for the pushing identity information.

An embodiment of a system 100 for pushing identity information is shown on FIG. 1. The system 100 can include at least one device 102 or 116 (e.g. computer 102 or computer 116) and one or more communication devices 104 or 112 that may interact with the computer 102 or 116. The communication device 104 or 112 can be an Internet-protocol-enabled telephone (IP-enabled phone) 104. The IP-enabled phone shall be used as an example of the communication device 104 hereinafter for ease of description. However, the embodiments are not enabled to using only an IP-enabled phone. The one or more devices 104 or 116 that interact with the computer 102 or 116 may communicate either directly with the computer 102 or 116 or through a network 106. The computer 102 or 116 can be any computer system or computers as described in conjunction with FIG. 6 and FIG. 7. Generally, the computer 102 or 116 can include a processor and memory and be able to execute applications on the processor. The other devices, such as, IP-enabled phones 104 or 112, may also have a processor memory and execute applications. The other devices 104 or 112 may also be a computing system or computer as described in conjunction with FIG. 6 and FIG. 7. Computer 102 and communication device 104 can be associated with a first user. Communication device 3 (e.g., IP-enabled phone 112) and computer 116 may be associated with a second user. In embodiments, the system 100 includes more devices than those shown in FIG. 1.

Figure 6:
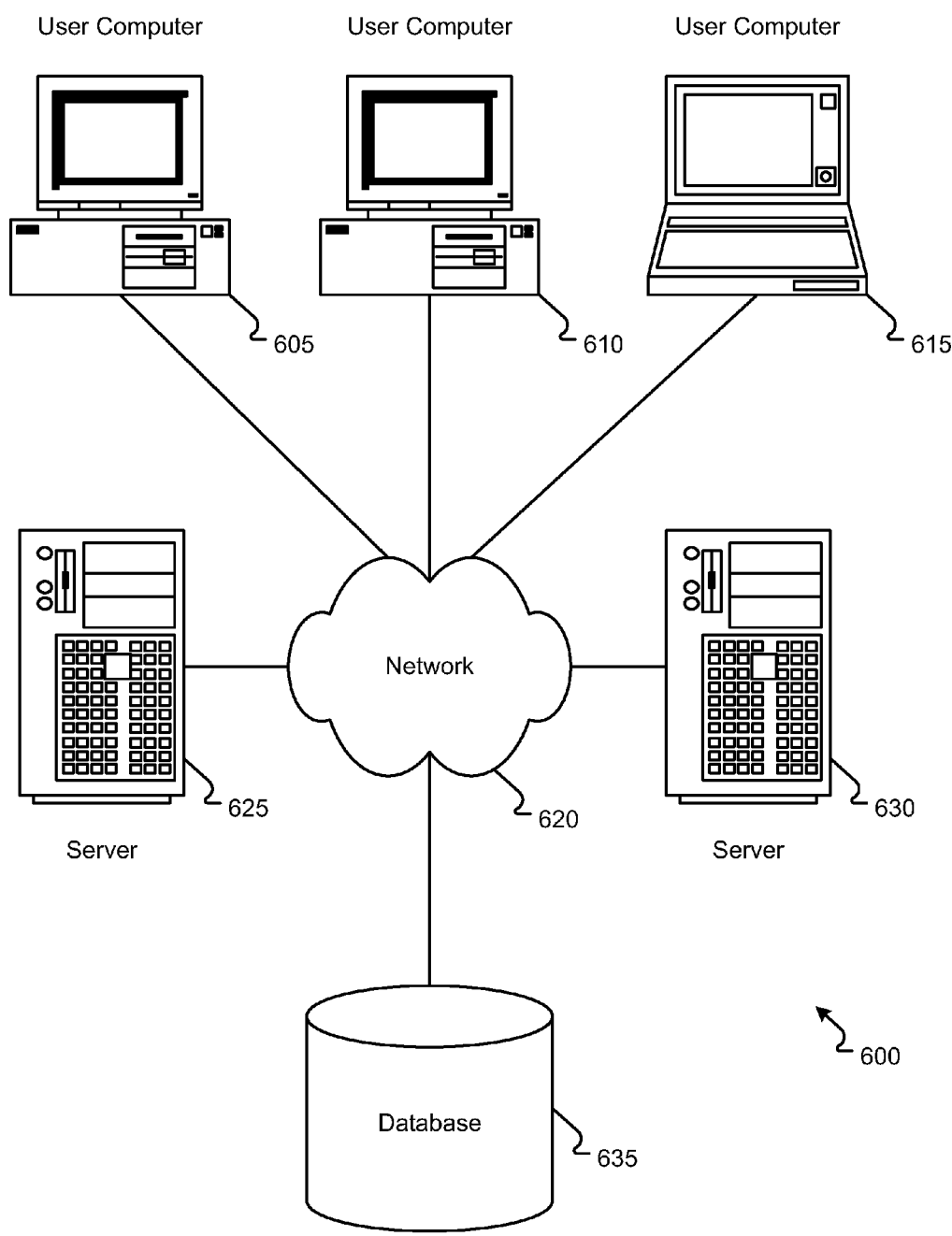
FIG. 6 is a block diagram of an embodiment of a computing environment operable to execute the embodiments described herein.
Figure 7:
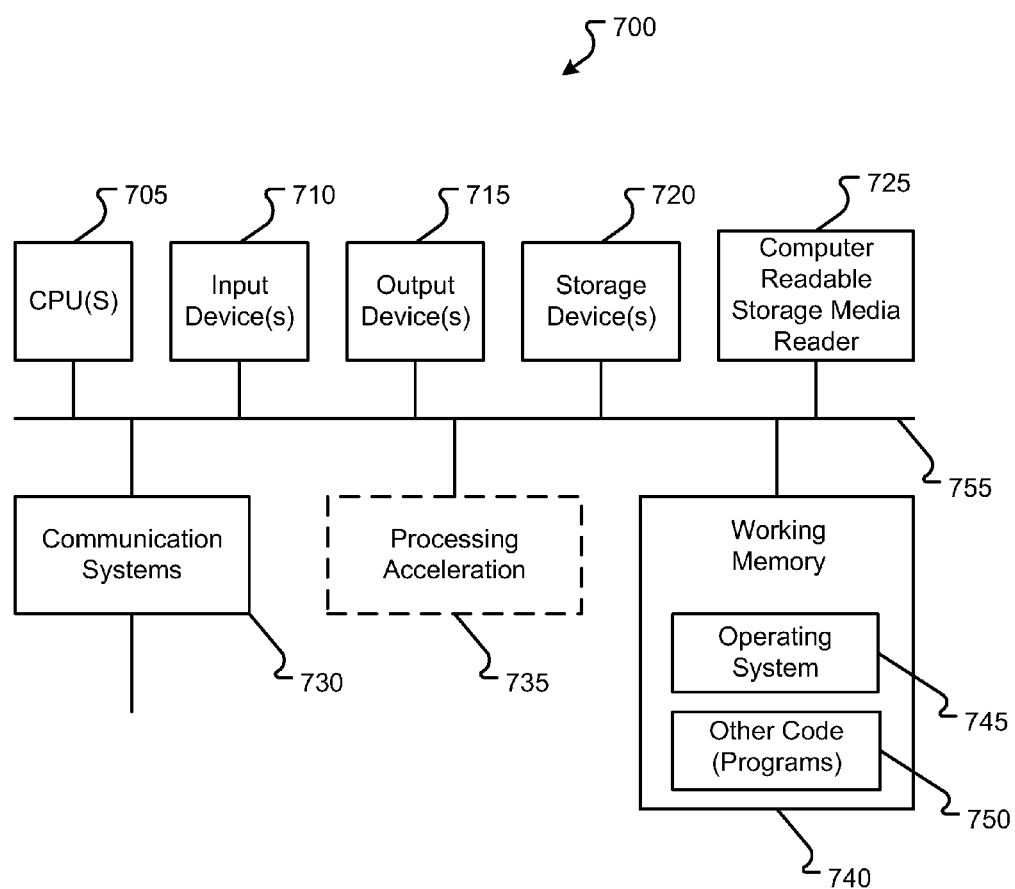
FIG. 7 is a block diagram of an embodiment of a computer or computing system environment operable to execute as the one or more devices described herein.

The network 106 can be any network or communication system as described in conjunction with FIG. 6 and FIG. 7. Generally, the network 106 can be a local area network (LAN), a wide area network (WAN), a wireless LAN, a wireless WAN, the Internet, etc. that receives and transmits messages or data between devices, such as, computer 102 and IP-enabled phone 104. The network 106 may communicate in any format or protocol known in the art, such as, transmission control protocol/internet protocol (TCP/IP), 802.11g, 802.11n, Bluetooth, or other formats or protocols.

The system 100 can also include one or more databases or be able to communicate with one or more databases or data sources. For example, a personnel/customer database 108 may store information about personnel within an organization or customers that are associated with an organization. The personnel/customer database 108 can be any type of databases described in conjunction with FIG. 6 and FIG. 7 and stored on any type of tangible computer readable medium. The devices, such as the computer 102 or 116, can communicate with the personnel/customer database 108 through the network 106.

Other databases may be external to the organization, such as external source(s)/database(s) 110. The external source(s)/database(s) 110 can be any database, as described in conjunction with FIG. 6 and FIG. 7, or can be a source of information that is external to the organization. For example, the external source(s)/database(s) 110 can be information extracted from social media sources, for example, Facebook, Plaxo, LinkedIn, Spoke, Twitter, other blogs, other micro blogs, other video blogs, or other such sources of information. The devices, such as computer 102, can communicate with the external source(s)/database(s) 110 through the network 106 and one or more other networks that may not be shown in FIG. 1. In embodiments, the external source(s)/database(s) 110 may also represent an email system where one or more emails, associated with either person involved with a communication, may be retrieved. For example, from identity information retrieved or received for the communication, a system can retrieve emails from the past three days that include the parties as addressees. The external source(s)/database(s) 110 can be other sources of information that also may provide data after receiving identity information.

The system 100 can also include a communication application 114 and/or 118. The communication application 114 and/or 118 can be a software module executed on at least one device in the system 100. For example, device 1 102 is executing the communication application 114 in the embodiment shown in FIG. 1. It should be noted that the communication application 114 and/or 118 may be executed on a server or other computer system that communicates with both device 1 102 and device 4 116. The communication application 114 and/or 118 is operable to communicate with the IP-enabled phones 104 or 112 (or other communication devices and phones) through other communication media, for example, email, text messaging, SIP messaging, XML messaging, etc. Further, the communication application 114 and/or 118 can provide information that initiates the transfer of alias information. Data transfers between devices 102 and/or 104 can occur using XML, SIP messaging, or other communications systems to import content from one device to another device. Further, the communication application can send information through traditional DCP phones.

Figure 2:
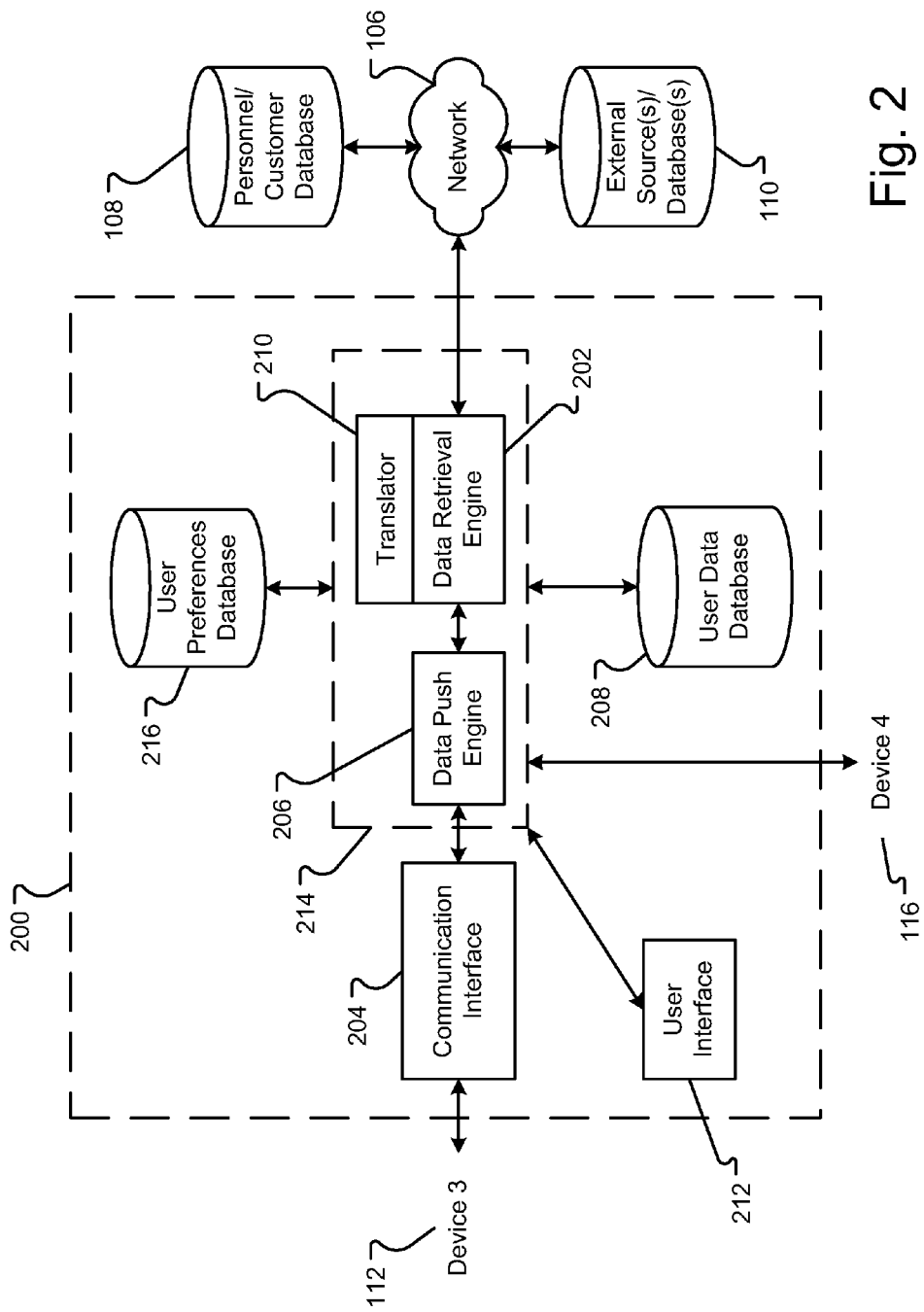
FIG. 2 is a block diagram of an embodiment of a computer system operable to push and receive identity information.

Embodiment of a software system 200 that can send and receive alias information is shown in FIG. 2. The components shown in the software system 200 can execute on one or more of the devices, such as, the computer 102 and/or 112 and/or the IP enabled telephone 104 and/or 116. In other embodiments, the software can be executed in another system, such as a server, not shown in FIG. 1 or in a cloud computing environment, also not shown in FIG. 1. Thus, the software system 200 can be a software service or other program that is operable to push alias information. The embodiments explained hereinafter will be explained as the software system 200 is executing in an IP-enabled phone 104, but the embodiments are not limited to this configuration.

The software system 200 can include a communication interface 204. The communication interface 204 can include an application to conduct voice communications with another communication device, e.g., device 3 112. Thus, the communication interface is operable to conduct a phone call. In further embodiments, the communication interface 204 can also receive alias information from other devices 112. Thus, the communication interface 204 may send and receive data through SIP messaging, XML messaging, or other communication protocol. The alias information can be passed to the data application 214.

The data application 214 includes modules to push and receive alias information. To assemble or import alias information, the data retrieval engine 202 can use a data structure that can be created in a user data database 208. Using the information received from the communication interface 204, the data retrieval engine 202 can also retrieve a data structure from the user data database 208. The data retrieval engine 202 can then retrieve data for the data structure. In some instances, the copied information is in a proprietary format. As such, the data retrieval engine 202 may include a translator 210 that can translate the data from the proprietary format into another format, for example, extensible markup language (XML). Thus, the data incorporated into the data structure is in a general format and may be more easily translated or provided to other programs.

The data retrieval engine 202 can also communicate with one or more other sources of data 108 and/or 110 to retrieve data associated with the alias information. For example, the data retrieval engine 202 can communicate with a personnel/customer database 108 to retrieve more information for the data structure. This information can be information associated with customer activity associated with the organization associated with the software system 200. The information may also be information about an employee or other person associated with the organization.

In other embodiments, the data retrieval engine 202 can interface, through a network 106 and possibly one or more other networks, to the external source(s)/database(s) 110 to retrieve information for the data structure. For example, the data retrieval engine 202 can retrieve information from social media sites, such as, Facebook, Plaxo, LinkedIn®, etc. The other information is retrieved from the external sources and included into the data structure. Examples of the alias information sent to the software system 200 and the information retrieved from the social media sites is described in conjunction with FIG. 3.

After completing the retrieval of data, the data retrieval engine 202 may then provide the data from the data structure into the user interface 212 or store the information in the user data database 208. The software system 200 can include a user interface 212. The user interface 212 can include a display for the IP-enabled phone 104. The user interface 212 can receive selections or inputs from user interface devices, such as a mouse, a keyboard, a touch screens, or other input devices. The user interface selections are received by the user interface 212 and provided to the data application 214. Further, the user interface 212 can display information associated with the alias of a caller.

The data application 214 also includes a data push engine 206. The data push engine 206 is operable to assemble alias information and push the alias information to another communication device. To assemble the alias information, the data push engine 206 can use a data structure that can be created in a user data database 208. A request may be received from another device 112 for alias information. In response to the request, the data push engine 206 can retrieve the data structure from the user data database 208. An embodiment of the data structure is described in conjunction with FIG. 3.

The data push engine 206 can retrieve alias data for the data structure. Thus, the data push engine 206 can communicate with one or more other sources of data 108, 208, and/or 216 to retrieve data associated with the alias information. For example, the data push engine 206 can communicate with a user data database 208 to retrieve one or more aliases associated with the user. This alias information can be associated with the user identified in the communication.

In other embodiments, the data push engine 206 can interface, through a network 106 and possibly one or more other networks, to the external source(s)/database(s) 110 to retrieve alias information for the data structure. For example, the data push engine 206 can retrieve alias information from social media sites, such as, Facebook, Plaxo, LinkedIn®, etc. The alias information is retrieved from the external sources and included into the data structure. Examples of the alias information sent to the software system 200 and the information retrieved from the social media sites is described in conjunction with FIG. 3.

After completing the retrieval of alias information, the data push engine 206 may push the data structure to the other user. In embodiments, the alias information is sent to the other communication device via media associated with the phone call (e.g., a SIP interaction formed to facilitate the phone call). In other embodiments, the data push engine 206 pushes the alias information to another device, e.g., the computer 116. Thus, the data push engine 206 may access information about the distant caller to determine an email or other address for the distant caller and associated with the computer 116. Then, the data push engine 206 pushes the alias information to the computer 116. In embodiments, the data push engine 206 also pushes presence information to the computer 116

The data push engine 206 may also be operable to enforce user preferences regarding the information about aliases provided or obtained. Thus, the data push engine 206 may communicate with a user preferences database 216, which may be any type of database described in conjunction with FIGS. 6 and 7. The user preferences database 216 may be operable to store user preferences for about how alias information is pushed and what information can be obtained from the social media sites. The user may set these preferences before sharing alias information. Typical constraints on sharing alias information can restrict the pushing of a certain type of alias to a certain group of users (E.g., push a portion of the aliases to business associated, push another portion of the aliases to friends and family, do not ever push some aliases, etc.). Further, the preferences may restrict the kind of information gleaned from the social media sites (e.g., vacation pictures are not sent to business associates, work posts are not sent to friends, etc.). In embodiments, the degree of separation for a social media site (e.g., LinkedIn) can dictate how much information is provided. For example, if there is only a single degree of separation, all the available information is provided. However, if there are more degrees of separation, then less information is provided. At some level of degree of separation, no information may be provided.

Figure 3:
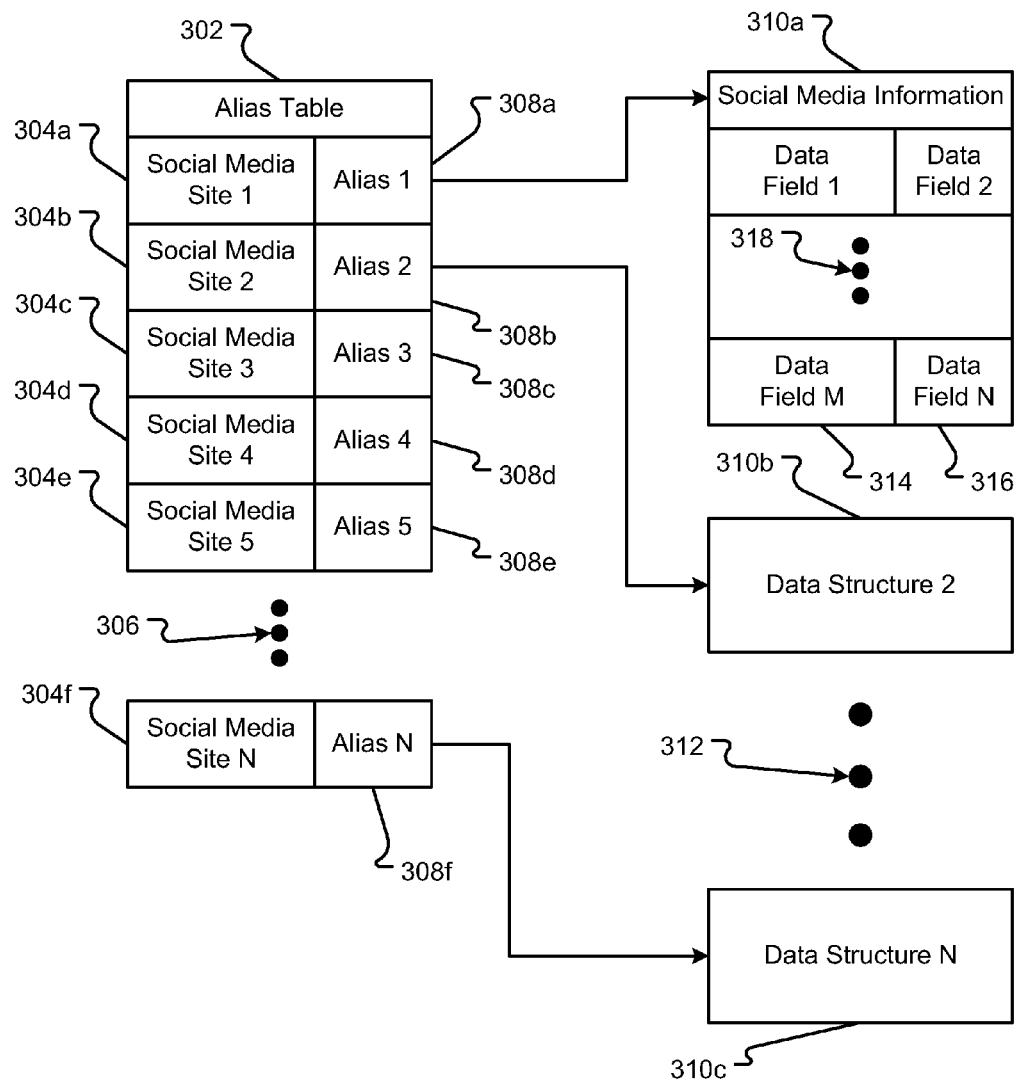
FIG. 3 are embodiments of data structures operable to push identity information.

Embodiments of data structures that may be included in the user data database 208 are shown in FIG. 3. The data structures can include one or more segments or fields, which store data in an organized fashion. The data structures may be associated with one or more types of databases including flat file databases, object orientated databases, relational databases, etc. Further, the data structures may be components of databases as described in conjunction with FIGS. 6 and 7.

An alias data structure 302 can include identifications for one or more sources of social media (referred to as social media sites). For example, the alias data structure 302 can include one or more fields 304a, 304b, 304c, 304d, 304e, 304f, etc. that include an identifier for a social media site. The social media identifier 304 can be the name of the social media site (e.g., Twitter), an Internet address for the social media site, the uniform resource locator, a globally unique identifier, or some other identifier. The social media identifier 304 may provide information to another party as to what information may be obtained from the social media site.

Associated with each social media identifier 304 is one or more aliases associated with the user for the identified social media site. The alias can be a nickname, name, or other identifier used by the person on the particular social media site. The user may employ two or more aliases for a single social media site and, thus, there may be more than one entry 304 or alias 308 for each alias used. Data structure 302 can be pushed by data push engine 206 to another communication device.

After being received by the distant communication device, the alias 308 and social media identifier 304 point to one or more of the data structures 310a, 310b, 310c, etc. There may be more or social media sites with alias information than those shown in FIG. 3, as represented by ellipses 306. Also, there may be as many available data structures 310 as there are social media site and alias information pairings. There may be more or fewer data structures 310, as represented by ellipses 312.

The data structures 310 may include one or more data fields 314 and/or 316. The data fields 314 and/or 316 for each data structure 310 can be particular to the type of social media application. Further, each data structure 310 may have more or fewer fields than those shown in data structure 310a, as represented by ellipses 318. Also, each data structure 310 can include a set of metadata that describes what data may be retrieved as dictated by the user preferences within that data structure 310. The metadata can describe how the data should be copied from the social media site, may describe how obtain data from the social media site, how to logon or access the social media site, may describe other external sources for the data (e.g., Facebook and Twitter, governmental records, etc.), when the data may be retrieved, or other information that enables the importation of content associated with the alias.

The metadata may be created automatically through intelligence agents that are able to interpret the function of social media applications or may be entered manually through user input into the user preferences database 216. As such, the user can create new preferences based on different requirements or different social media sites. The creation of the data structure 310 may be automated by the data retrieval engine 202 traversing or reviewing data within the social media site and creating data structures 310 that will be operable to store and/or import that content. The data retrieved from the social media sites can include one or more of, but is not limited to, names for the user, addresses for the user, phone numbers, email address, text messaging addresses, likes and dislikes, consumer activity, travel habits, an identity of a friend, an occupation, an income, or a spouse's identity, etc.

Figure 4:
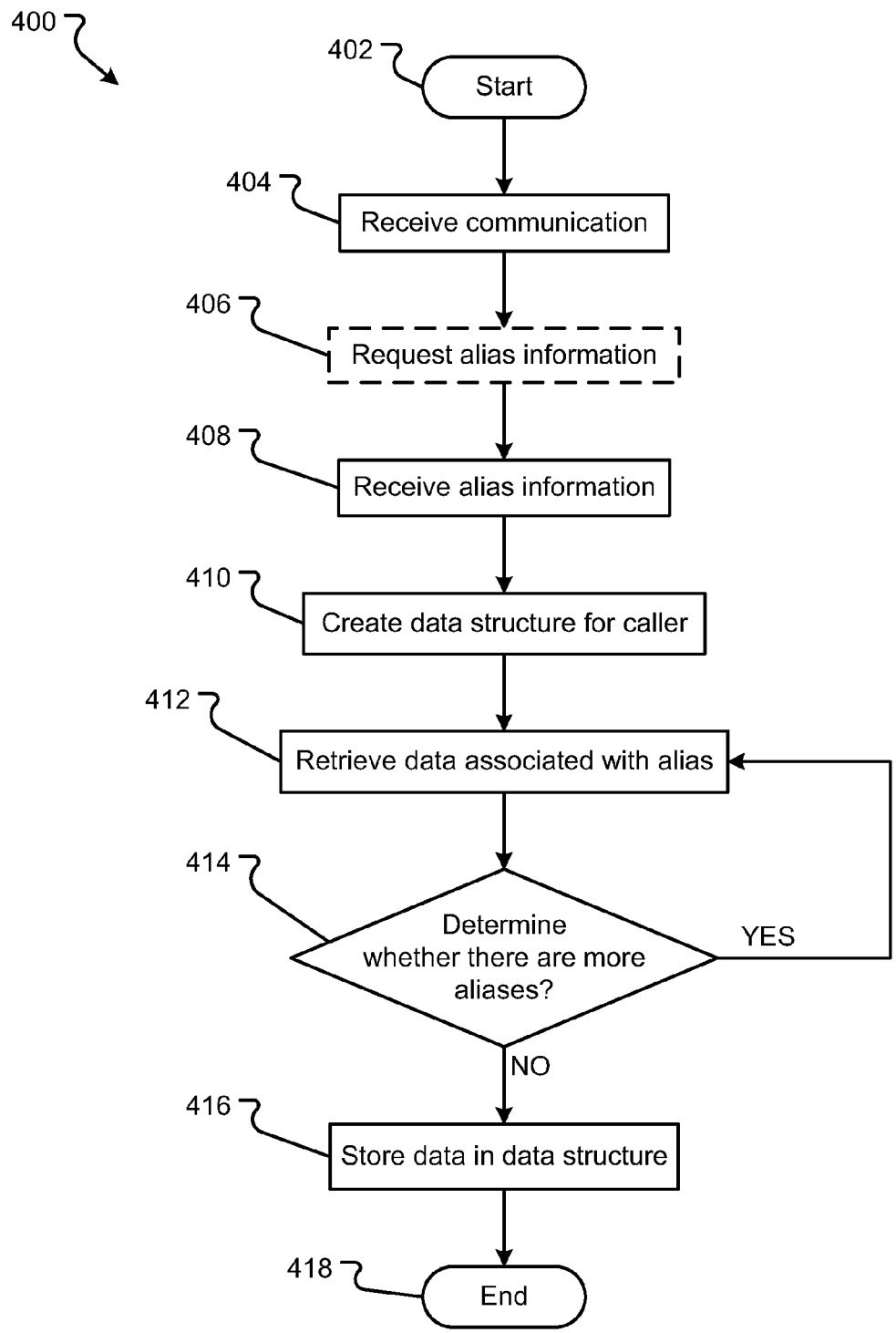
FIG. 4 is a flow diagram of an embodiment of a process for receiving identity information.

An embodiment of a method 400 for importing content as shown in FIG. 4. The embodiment shown in FIG. 4 is from the view of a called party. Generally, the method 400 begins with a start operation 402 and terminates with an end operation 418. While a general order for the steps of the method 400 are shown in FIG. 4, the method 400 can include more or fewer steps or arrange the order of the steps differently than those shown in FIG. 4. The method 400 can be executed as a set of computer-executable instructions executed by a computer system and encoded or stored on a computer readable medium. Hereinafter, the method 400 shall be explained with reference to the systems, components, modules, data structures, user interfaces, etc. described in conjunction with FIGS. 1-3.

A communication interface 204 receives a communication from another device 112, in step 404. The communications interface 204 can be as shown in FIG. 2. Thus, the communication interface 204, as part of an IP-enabled phone 104, may receive a phone call from another IP-enabled phone 112. The phone call can include the provision of the caller's name and other information (as is received with caller identifier). The communication interface 204 may establish a SIP communication link between the two IP-enabled phones 104 and 112. Thus, information may be exchanged over the SIP communication link.

In response to establishing the communication, the data retrieval engine 202 optionally can request alias information from the IP-enabled phone 112, in step 406. For example, a the data retrieval engine 202 can direct the communications interface 204 to send a SIP message to the IP-enabled phone 112 for alias information. The request, in embodiments, may include a data structure 302 including metadata that provides information to the other communication device 112 to provide alias information.

The other communication device 112 can gather the alias information, store the alias information into the data structure 302, and send the data structure 302 to the IP-enabled phone 104. The IP-enabled phone 104 may then receive the alias information, in step 408. The alias information may be included in the data structure 302. With the alias information, the data retrieval engine 202 can create a data structure 310 for the caller associated with the alias information, in step 410. The data structure 310 may be created with fields 314 and/or 316 with respect to the social media sites 304, alias information 308, and metadata provided with the data structure 302. Thus, the data structure 310 can be constructed based on the information that may be obtained from the social media sites provided in field 304. A new data structure can be created for each new caller.

The data retrieval engine 202 can then use the social media site information in field 304 and the alias information in field 308 to obtain data associated with the caller, in step 412. Thus, the data retrieval engine 202 accesses one or more social media sites and obtains information associated with the aliases. In some instances, the data retrieval engine 202 friends or subscribes to information associated with the alias. Some social media sites will require the user to accept the subscription. In other instances, the data retrieval engine 202 searches and copies data from the social media sites without a subscription.

The data retrieval engine 202 may then copy data from the social media sites. After copying data from a social media site, the data retrieval engine 202 can then determine whether there are more aliases for that site or other sites to communicate with to copy data, in step 414. If there are more sites or other aliases at the current site from which to copy data, step 414 proceeds "YES" back to step 412. If there are no other aliases or sites from which to copy data, step 414 proceeds "NO" to step 416. In step 416, the data retrieval engine 202 stores the retrieved data into the data structure 310. IN embodiments, a translator 210 may translate the data from a proprietary format into a general format for storage in the data structure 310. After the data is stored in the data structure 310, the data structure 310 may be stored in the user data database 208.

Figure 5:
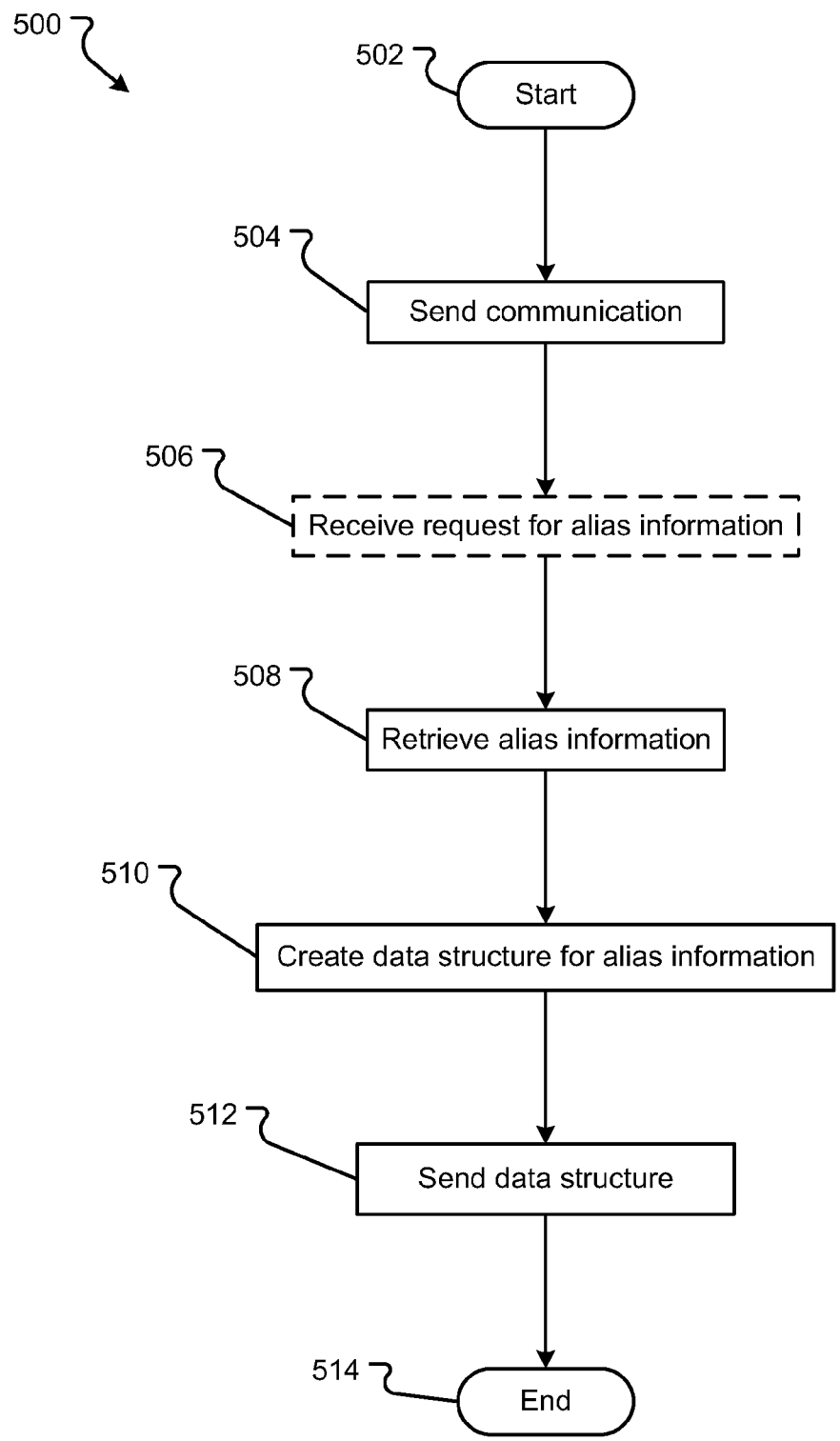
FIG. 5 is another flow diagram of an embodiment of a process for pushing identity information.

An embodiment of a method 500 for copying data into a data structure for importing content is shown in FIG. 5. Generally, the method 500 begins with a start operation 502 and terminates with an end operation 514. While a general order for the steps of the method 500 are shown in FIG. 5, the method 500 can include more or fewer steps or arrange the order of the steps differently than those shown in FIG. 5. The method 500 can be executed as a set of computer-executable instructions executed by a computer system and encoded or stored on a computer readable medium. Hereinafter, the method 500 shall be explained with reference to the systems, components, modules, data structures, user interfaces, etc. described in conjunction with FIGS. 1-3.

A communication interface 204 sends a communication for another device 112, in step 504. The communications interface 204 can be as shown in FIG. 2. Thus, the communication interface 204, as part of an IP-enabled phone 104, may initiate and send a phone call to another IP-enabled phone 112. The phone call can include the provision of the caller's name and other information (as is received with caller identifier). The communication interface 204 may establish a SIP communication link between the two IP-enabled phones 104 and 112. Thus, information may be exchanged over the SIP communication link.

In response to establishing the communication, the data push engine 206 optionally can receive a request for alias information from the IP-enabled phone 112, in step 506. For example, the data push engine 206 can receive, from the communications interface 204, a SIP message to provide the IP-enabled phone 112 alias information. The request, in embodiments, may include a data structure 302 including metadata that provides information to the communication device 104 to provide alias information.

The data push engine 206 of the communication device 104 can gather the alias information, in step 508. For example, the data push engine 206 can communicate with the user data database 208 to retrieve alias information. The alias information may be provided by the user or be automatically stored when the user communicates with a social media site. The data push engine 206 may then create a data structure 302, in step 510. The data structure 302 can store the alias information and may be modified depending on the alias information available. As such, the number of fields or data to be included can change based on the alias information. The alias information may then be stored in the data structure 302. After storing the available alias information, the data push engine 206 can direct the communications interface 204 to send the data structure 302 to the other communication device 112, in step 512.

In alternative embodiments, the data push engine 206 may send the alias information to another device associated with the caller. The caller may provide other information with the request for alias information or may provide other information automatically in establishing the phone call. The other information can include an email address, text message address, or other communication address. In embodiments, the other information can direct the alias information to the computer 116 associated with the communication device 112. As such, the alias information can be sent to the computer 116 where the information can be used to retrieve information about the caller. In still other embodiments, a server receives the alias information for both parties in the call and retrieves information for both parties in the call.

FIG. 6 illustrates a block diagram of a computing environment 600 that may function as system or environment for the embodiments described herein. The system 600 includes one or more user computers 605, 610, and 615. The user computers 605, 610, and 615 may be general purpose personal computers (including, merely by way of example, personal computers and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 605, 610, 615 may also have any of a variety of applications, including for example, database client and/or server applications, and web browser applications. Alternatively, the user computers 605, 610, and 615 may be any other electronic device, such as a thin-client computer, Internet-enabled mobile telephone, and/or personal digital assistant, capable of communicating via a network (e.g., the network 620 described below) and/or displaying and navigating web pages or other types of electronic documents. Although the exemplary system 600 is shown with three user computers, any number of user computers may be supported.

System 600 further includes a network 620. The network 620 can be any type of network familiar to those skilled in the art that can support data communications using any of a variety of commercially-available protocols, including, without limitation, TCP/IP, SNA, IPX, AppleTalk, and the like. Merely by way of example, the network 620 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks.

The system 600 may also include one or more server computers 625, 630. One server may be a web server 625, which may be used to process requests for web pages or other electronic documents from user computers 605, 610, and 615. The web server can be running an operating system including any of those discussed above, as well as any commercially-available server operating systems. The web server 625 can also run a variety of server applications, including HTTP servers, FTP servers, CGI servers, database servers, Java servers, and the like. In some instances, the web server 625 may publish operations available operations as one or more web services.

The system 600 may also include one or more file and or/application servers 630, which can, in addition to an operating system, include one or more applications accessible by a client running on one or more of the user computers 605, 610, 615. The server(s) 630 may be one or more general purpose computers capable of executing programs or scripts in response to the user computers 605, 610 and 615. As one example, the server may execute one or more web applications. The web application may be implemented as one or more scripts or programs written in any programming language, such as Java™, C, C#™ or C++, and/or any scripting language, such as Perl, Python, or TCL, as well as combinations of any programming/scripting languages. The application server(s) 630 may also include database servers, including without limitation those commercially available from Oracle, Microsoft, Sybase™, IBM™ and the like, which can process requests from database clients running on a user computer 605.

The web pages created by the web application server 630 may be forwarded to a user computer 605 via a web server 625. Similarly, the web server 625 may be able to receive web page requests, web services invocations, and/or input data from a user computer 605 and can forward the web page requests and/or input data to the web application server 630. In further embodiments, the server 630 may function as a file server. Although for ease of description, FIG. 5 illustrates a separate web server 625 and file/application server 630, those skilled in the art will recognize that the functions described with respect to servers 625, 630 may be performed by a single server and/or a plurality of specialized servers, depending on implementation-specific needs and parameters. The computer systems 605, 610, and 615, file server 625 and/or application server 630 may function as servers or other systems described herein.

The system 600 may also include a database 635. The database 635 may reside in a variety of locations. By way of example, database 635 may reside on a storage medium local to (and/or resident in) one or more of the computers 605, 610, 615, 625, 630. Alternatively, it may be remote from any or all of the computers 605, 610, 615, 625, 630, and in communication (e.g., via the network 620) with one or more of these. In a particular set of embodiments, the database 635 may reside in a storage-area network ("SAN") familiar to those skilled in the art. Similarly, any necessary files for performing the functions attributed to the computers 605, 610, 615, 625, 630 may be stored locally on the respective computer and/or remotely, as appropriate. In one set of embodiments, the database 635 may be a relational database, such as Oracle 10i™, that is adapted to store, update, and retrieve data in response to SQL-formatted commands. Database 635 may be the same or similar to the database used herein.

FIG. 7 illustrates one embodiment of a computer system 700 upon which servers or other systems described herein may be deployed or executed. The computer system 700 is shown comprising hardware elements that may be electrically coupled via a bus 755. The hardware elements may include one or more central processing units (CPUs) 705; one or more input devices 710 (e.g., a mouse, a keyboard, etc.); and one or more output devices 715 (e.g., a display device, a printer, etc.). The computer system 700 may also include one or more storage device 720. By way of example, storage device(s) 720 may be disk drives, optical storage devices, solid-state storage device such as a random access memory ("RAM") and/or a read-only memory ("ROM"), which can be programmable, flash-updateable and/or the like.

The computer system 700 may additionally include a computer-readable storage media reader 725; a communications system 730 (e.g., a modem, a network card (wireless or wired), an infra-red communication device, etc.); and working memory 740, which may include RAM and ROM devices as described above. In some embodiments, the computer system 700 may also include a processing acceleration unit 735, which can include a DSP, a special-purpose processor and/or the like.

The computer-readable storage media reader 725 can further be connected to a computer-readable storage medium, together (and, optionally, in combination with storage device(s) 720) comprehensively representing remote, local, fixed, and/or removable storage devices plus storage media for temporarily and/or more permanently containing computer-readable information. The communications system 730 may permit data to be exchanged with the network 720 and/or any other computer described above with respect to the system 700. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 700 may also comprise software elements, shown as being currently located within a working memory 740, including an operating system 745 and/or other code 750, such as program code implementing the servers or devices described herein. It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other types of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments have been described in detail herein, it is to be understood that the inventive concepts may be otherwise variously embodied and employed, and that the appended claims are intended to be construed to include such variations, except as limited by the prior art.

What is claimed is:

1. A method for pushing identity information, comprising:
receiving, by a first communication device, a communication from a second communication device;
the first communication device receiving alias information from the second communication device of a second user, wherein the alias information comprises a first and second of alias of a second user on a social media network;
with the alias information, the first communication device retrieving data associated with the second user from the social media network; and
receiving a preference from the second communication device, wherein the preference contains information to restrict access to a kind of data associated with the second user that is retrieved from the social media network by a first user of the first communication device.

2. The method as defined in claim 1, further comprising, in response to receiving the communication, the first communication device requesting the alias information.

3. The method as defined in claim 2, further comprising, in response to receiving the communication, creating a data structure for the alias information and sending the data structure with the request for the alias information.

4. The method as defined in claim 2, further comprising:
creating a data structure for the alias information;
sending the data structure with the request for the alias information; and
storing the alias information in the data structure.

5. The method as defined in claim 4, further comprising storing data associated with alias information in the data structure.

6. The method as defined in clam 1, wherein restricting access to the kind of data associated with the second user that is retrieved from the social media network by the user of the first communication device is based on a degree of separation between the first user and the second user.

7. The method as defined in claim 1, wherein restricting access to the kind of data associated with the second user that is retrieved from the social media network by the first user of the first communication device is based on whether the second user is a business associate or friend of the first user.

8. The method as defined in claim 1, wherein the alias information further comprises a third alias of the first user on a second social media network.

9. The method as defined in claim 8, further comprising restricting out the third alias of the first user on the second social media network based on the identity of the second user.

10. The method as defined in claim 1, further comprising pushing the alias information from the second communication device, wherein the second alias of the second user on the social media network has been restricted out of the pushed alias information based on the identity of the first user.

11. A communication device comprising:
a memory;
a processor in communication with the memory, the processor operable to execute computer-executable instructions, wherein the computer executable instructions cause the processor to execute two or more modules, the two or more modules comprising:
a communication interface operable to send a communication to a second user of a second communication device;
a data push engine operable to:
receive a request for alias information from the communication interface received in response to the communication with the second communication device;
retrieve alias information for the first user of the communication device, wherein the alias information comprises a first and second of alias of the first user on a first social media network;
push the alias information to the second user of the second communication device; and
push a preference to the second user of the second communication device, wherein the preference contains information to restrict access to a kind of data associated with the first user that is retrieved from the first social media network by the second user of the second communication device.

12. The communication device as defined in claim 11, wherein the data push engine is further operable to:
receive identity information for the second user;
retrieve a communication address for the second user; and
push the alias information to a third communication device associated with the communication address.

13. The communication device as defined in claim 11, wherein the two or more modules further comprising a data retrieval engine operable to:
in response to the sent communication, request second alias information, associated with the second user, from the second communication device;
receive the second alias information from the communication interface, wherein the second alias information identifies the second user of the second communication device on a second social media network; and
with the second alias information, retrieve data associated with the second user from the second social media network.

14. The communication device as defined in claim 13, the data retrieval engine further operable to:
in response to the sent communication, create a data structure for the second alias information; and
send the data structure to the second communication device.

15. The communication device as defined in claim 14, wherein the data structure includes:
a first field operable to store an identity of a social media site; and
a second field operable to store an alias associated with the second user for the social media site.

16. The communication device as defined in claim 15, the data retrieval engine further operable to:
create a second data structure; and
store the data associated with the second user in the second data structure.

17. The communication device as defined in claim 16, wherein the data associated with the second user includes one or more of a name, an address, a phone number, an email address, a text messaging address, a like, a dislike, consumer activity, a travel habit, an identity of a friend, an occupation, an income, or a spouse's identity.

18. A computer program product including computer executable instructions stored onto a non-transitory computer readable medium which, when executed by a processor of a first IP-enabled phone, causes the processor to perform a method for pushing identity information, the instructions comprising:
- instructions to send a communication to a second IP-enabled phone, wherein the communication is between a first user of the first IP-enabled phone and a second user of the second IP-enabled phone;
- instructions to receive a request for alias information from the second IP-enabled phone, wherein the alias information identifies the first user on two or more social media networks;
- instructions to retrieve alias information for the first user;
- instructions to store the alias information in a first data structure, wherein the first data structure includes: a first field operable to store a first identity of a first social media site, a second field operable to store a first alias associated with the first user for the first social media site, a third field operable to store a second identity of a second social media site, a fourth field operable to store a second alias associated with the first user for the second social media site, and a fifth field operable to store a third alias associated with the first user for the first social media site;
- instructions to push the first data structure with the alias information to the second IP-enabled phone; and
- instructions to push a preference to the second IP-enabled phone, wherein the preference is contains information to restrict a kind of data associated with the first user that is retrieved from the two or more social media networks by the second user of the second communication device.

19. The computer program product as defined in claim 18, further comprising:
- instructions to determine an email address for the second user; and
- instructions to push the first data structure with the alias information to the email address.

20. The computer program product as defined in claim 19, further comprising
- instructions to apply a user preference to a retrieval of data associated with the first user from the two or more social media sites, wherein the user preference limits the data that is retrieved from the two or more social media sites; and
- instructions to send the user preference with the first data structure to be applied by the second IP-enable phone.

* * * * *